(12) United States Patent
Burström et al.

(10) Patent No.: US 7,971,698 B2
(45) Date of Patent: Jul. 5, 2011

(54) TELESCOPIC CHUTE

(75) Inventors: Anders Burström, Malmö (SE); Lars Grönvall, Trelleborg (SE)

(73) Assignee: Metso Minerals (Wear Protection) AB, Trelleborg (SE)

( * ) Notice: Subject to any disclaimer, the term of this patent is extended or adjusted under 35 U.S.C. 154(b) by 71 days.

(21) Appl. No.: 11/662,881

(22) PCT Filed: Sep. 14, 2005

(86) PCT No.: PCT/SE2005/001329
§ 371 (c)(1),
(2), (4) Date: Oct. 24, 2008

(87) PCT Pub. No.: WO2006/031188
PCT Pub. Date: Mar. 23, 2006

(65) Prior Publication Data
US 2009/0139828 A1    Jun. 4, 2009

Related U.S. Application Data

(60) Provisional application No. 60/610,701, filed on Sep. 17, 2004.

(30) Foreign Application Priority Data

Sep. 17, 2004 (SE) ........................ 0402252

(51) Int. Cl.
*B65G 11/10*    (2006.01)

(52) U.S. Cl. .................................. 193/25 E; 193/25 C
(58) Field of Classification Search ................ 193/15, 193/25 C, 25 E
See application file for complete search history.

(56) References Cited

U.S. PATENT DOCUMENTS

| | | | | |
|---|---|---|---|---|
| 2,658,603 A * | 11/1953 | Fernald | ...................... | 193/25 C |
| 4,750,602 A * | 6/1988 | Souda | ......................... | 193/25 E |
| 4,821,861 A | 4/1989 | Shannahan | | |
| 4,946,018 A * | 8/1990 | Binzen et al. | ................ | 193/25 C |
| 5,086,902 A * | 2/1992 | Dunnigan | ...................... | 193/25 C |
| 5,190,132 A | 3/1993 | Stanelle et al. | | |
| D345,039 S | 3/1994 | Doyle | | |
| 5,289,909 A * | 3/1994 | Maxwell et al. | ............. | 193/25 E |
| 5,372,229 A | 12/1994 | Leibling | | |
| 5,800,112 A * | 9/1998 | Stafford | ...................... | 193/25 C |
| 7,036,647 B2 * | 5/2006 | Malmberg | ................... | 193/25 C |

FOREIGN PATENT DOCUMENTS

EP        0522858        1/1993

* cited by examiner

*Primary Examiner* — James R Bidwell
(74) *Attorney, Agent, or Firm* — Kinney & Lange, P.A.

(57)    ABSTRACT

A chute for mechanical guiding of pieces or particles of material comprises two or more separate chute elements which are coaxially mounted above each other and connected by flexible connecting devices and designed to be telescopically mutually stackable. The separate chute elements have two or more replaceable wall elements.

19 Claims, 5 Drawing Sheets

TELESCOPIC CHUTE

FIELD OF THE INVENTION

The present invention relates to a chute for mechanical guiding of pieces or particles of material, said chute comprising two or more separate chute elements mounted coaxially above each other and connected by flexible connecting devices and designed to be telescopically mutually stackable.

The invention also relates to a wall element for a chute.

BACKGROUND ART

A device of the type mentioned by way of introduction is known from U.S. Pat. No. 5,372,229. Said patent publication discloses a chute for mechanical guiding of pieces or particles of material, said chute having two or more chute elements mounted substantially coaxially above each other and connected by flexible connecting devices and designed to be telescopically mutually stackable. An advantage of conveying a material through a chute compared with letting it fall freely is that the large amounts of dust that would otherwise occur will be reduced. In a telescopic chute, the falling material generates a pressure below atmospheric in the chute, whereby air is drawn into the space between the chute elements and dust is prevented from being spread. The construction of a telescopic chute as described above also gives increased flexibility compared with fixedly mounted chutes since a telescopic chute can easily be raised and lowered as required. This is particularly important when the chute is used for conveying a material consisting of several size fractions. If the distance between the mouth of the chute and the bulk heap is not short and constant, variable sorting of the material will take place, for instance caused by the wind effect. As a rule, the height of the chute is adjusted by ropes or wires, which pass through guides on some of the chute elements or all chute elements and are attached to the lowermost chute element, being used to lift the lowermost chute element. If the distance of lifting exceeds the distance between neighbouring chute elements, the chute elements will gradually be mutually stacked from below and up.

However, when using telescopic chutes of the type described above, problems with local wear are frequently experienced, when, for instance, a certain fraction of material continuously hits one and the same point on one and the same chute element and, thus, wears a hole in the same. Such local wear is unpredictable in the sense that you cannot know for sure where, that is on which surface of which chute element, it will occur. Known telescopic chutes suffer from the drawback that when local wear occurs, you cannot easily repair a separate chute element. In case of local wear, the entire chute element is generally replaced, and the worn one is discarded.

A possible solution would be to make the whole chute from an extremely abrasion resistant material from the beginning, which however is not done for several reasons. The first reason is that a more abrasion resistant material in general is synonymous with a heavier material, and since the chute generally is suspended from the outermost end of another structure, for instance a conveyor, the increased weight will cause a problem. Another reason is that if the chute is much more abrasion resistant than the material that is being conveyed, the material will be disintegrated into smaller fractions, which in general is not desirable. A third reason is that, as a rule, the same material properties are not desirable through an entire chute. For example, a shock-proof material is desired at the top of the chute while for chute elements further down in the chain, greater resistance to wear is more important. In addition to that mentioned above, also a cost aspect is to be taken into consideration.

Also chute elements that are square in cross-section are previously known, for instance from U.S. Pat. No. 345,039.

SUMMARY OF THE INVENTION

The object of the present invention is to eliminate the above problems and also provide a telescopic chute of a new and adjustable type.

A specific object is to be able to present a chute with adjustability which extends down to individual wall elements of the chute elements of the chute.

Another specific object is to provide a chute which is cost-effective. According to the present invention, the above objects are achieved by a chute having the features as defined in claim 1. Preferred embodiments of the chute are defined in the dependent claims 2-20. These objects are also achieved by a wall element according to claim 21.

The inventive chute has separate chute elements with replaceable wall elements, which additionally increases the above-mentioned flexibility of telescopic chutes while at the same time it significantly reduces the negative effect of local wear in terms of repair costs. Instead of replacing the entire chute element, only the damaged wall element is replaced. Since the chute according to the present invention has detachably mounted chute elements, the repair can be performed with the chute element positioned in the chute, but also, and more preferred, by first dismounting the chute element, after which it can be repaired at a suitable location.

It is preferred for the replaceable wall elements to be straight since this makes mounting/dismounting technically easier while at the same time it reduces the production costs.

According to one feature, the wall elements are connected to corner elements, which also simplifies mounting/dismounting while at the same time it gives the chute element good stability.

It is preferred for said corner element to form a rounded inner corner between the wall elements, thereby preventing conveyed material from baking on.

The rounded corner preferably has the form of a circular arc.

Alternatively, the rounded corner can have the form of a facet with obtuse angles or any other form that results in a rounded corner to prevent baking-on.

An inventive corner element is preferably mounted flush with the wall elements so that the chute elements have a smooth inner surface. This, too, gives the advantage that baking-on of material is minimised.

Moreover, it is preferred for the corner elements to comprise inner and outer parts to simplify mounting/dismounting of wall elements.

An inventive chute element has a frame which is arranged along the circumference of the chute element and to which each replaceable wall element is attached by an undercut groove in its upper portion. Thus the wall elements can be snapped in place over a profile formed in the frame. Due to such snap locking, the replaceable wall elements are safely held but easy to remove from the frame.

In one embodiment, the replaceable wall elements are bevelled inwards at their upper edge, thus preventing material from being collected at the upper edge of each chute element. This would otherwise give the chute an increased weight and, above all, cause problems when stacking the chute elements in one another. In combination with the inwardly directed airflow which is generated between the chute elements for flow reasons, the bevel of the edge prevents material from being collected on the upper side of the chute elements.

The wall elements are preferably made of an elastomeric material and advantageously of polyurethane or rubber. Polyurethane preferably has a hardness of 70-90° Shore A and the rubber a hardness of 40-65° Shore A to achieve the desirable advantages in terms of use. If necessary, the elastomeric material can be reinforced with polycarbonate plastic (PC) and/or be combined with a ceramic material or metal to achieve further advantages in terms of use.

BRIEF DESCRIPTION OF THE DRAWINGS

The invention will now be described in more detail with reference to the accompanying schematic drawings which by way of example illustrate a currently preferred embodiment of the invention.

DESCRIPTION OF PREFERRED EMBODIMENTS

Figure 1:
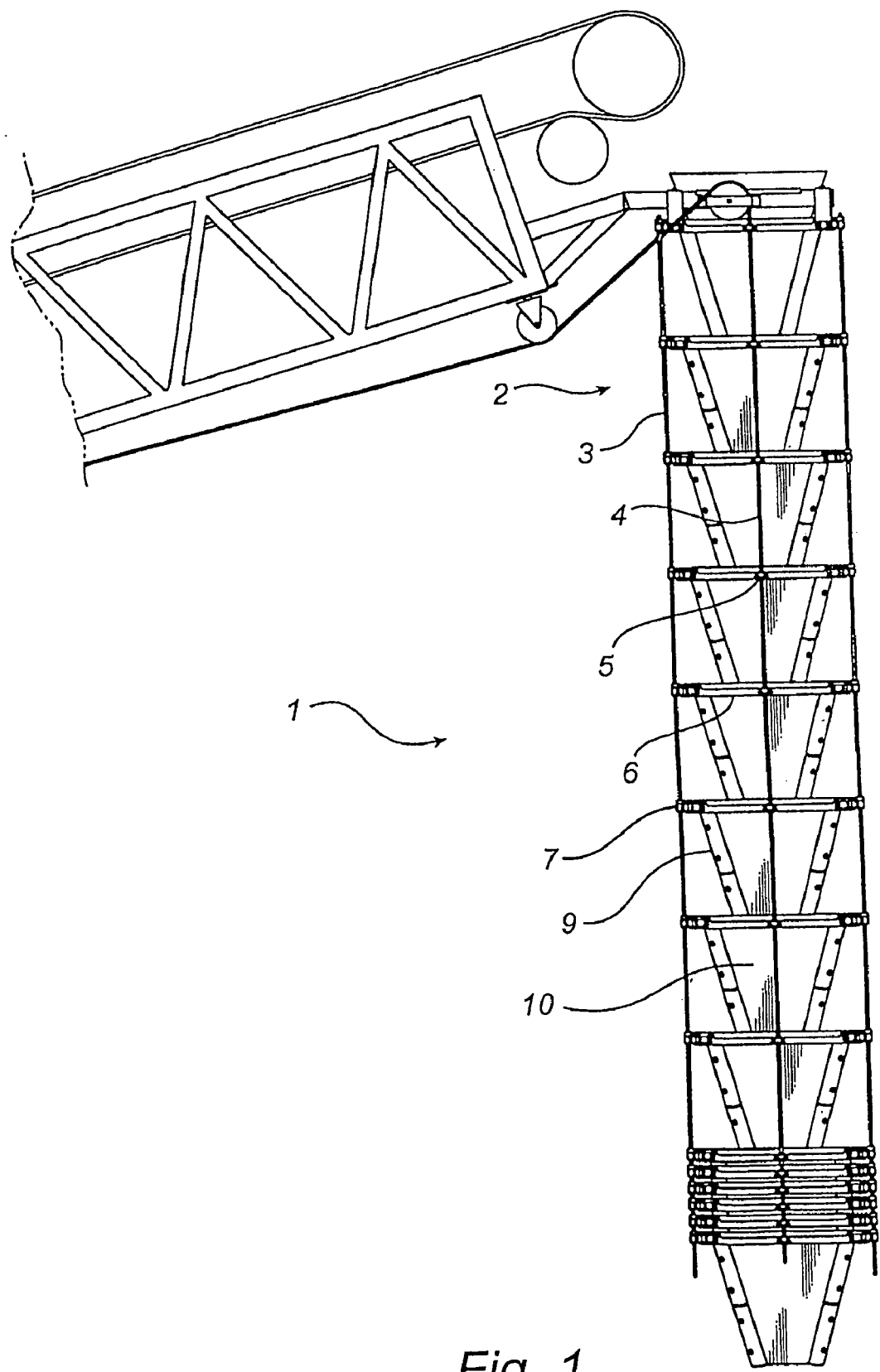
FIG. 1 is an overall view of an inventive chute with the lowermost chute elements lifted.
Figure 2:
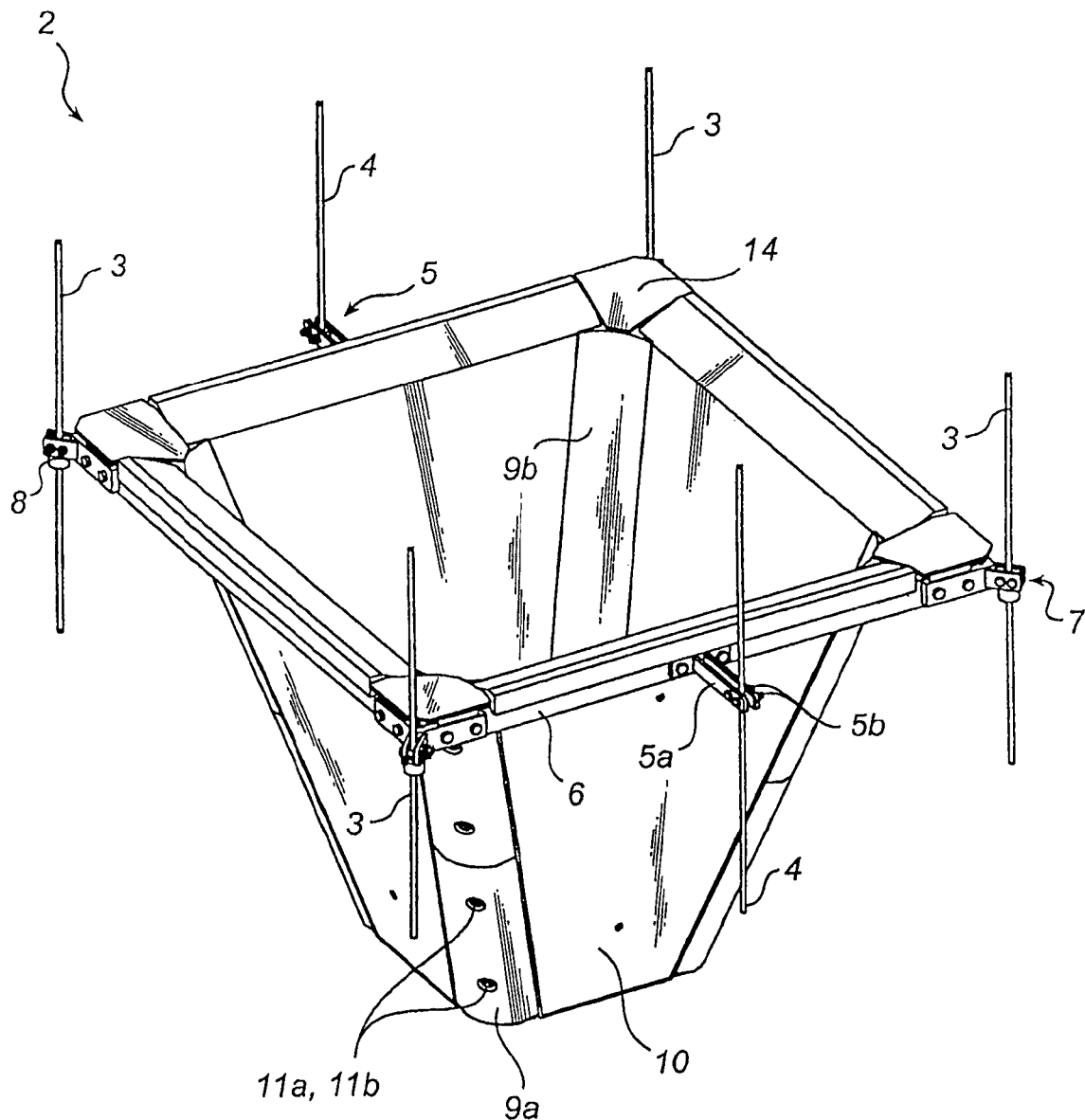
FIG. 2 is a perspective view of an individual chute element of the chute in FIG. 1.

The chute 1 according to the invention as shown in FIG. 1 comprises two or more chute elements 2 which are coaxially mounted above each other and connected by flexible connecting devices in the form of wires 3. The chute elements 2 are designed to be telescopically mutually stackable. The chute 1 is also provided with a hoisting device (not shown) which by means of ropes, wires or like flexible means, in the following referred to as hoist wires 4, can be used to move the mouth of the chute 1 up and down. The hoist wires 4 extend, as shown more distinctly in FIG. 2, through guides 5 mounted on the frame 6 at two sides of each chute element 2 and are further attached to the lowermost chute element to allow complete lifting. The guide 5 consists of two projecting tongues 5a between which the wire 4 extends. On both sides of the wire 4, screws 5b are screwed through holes in the tongues 5a, as shown in more detail in FIG. 2. The wires 3 for interconnecting the chute elements 2 pass through similarly designed guides 7 in the corners of the frame 6. To lock the position of the chute elements 2 in the vertical direction, a locking device 8 is movably arranged on the wire 3 under each of the guides 7 arranged in the corners of the frame 6.

Figure 3:
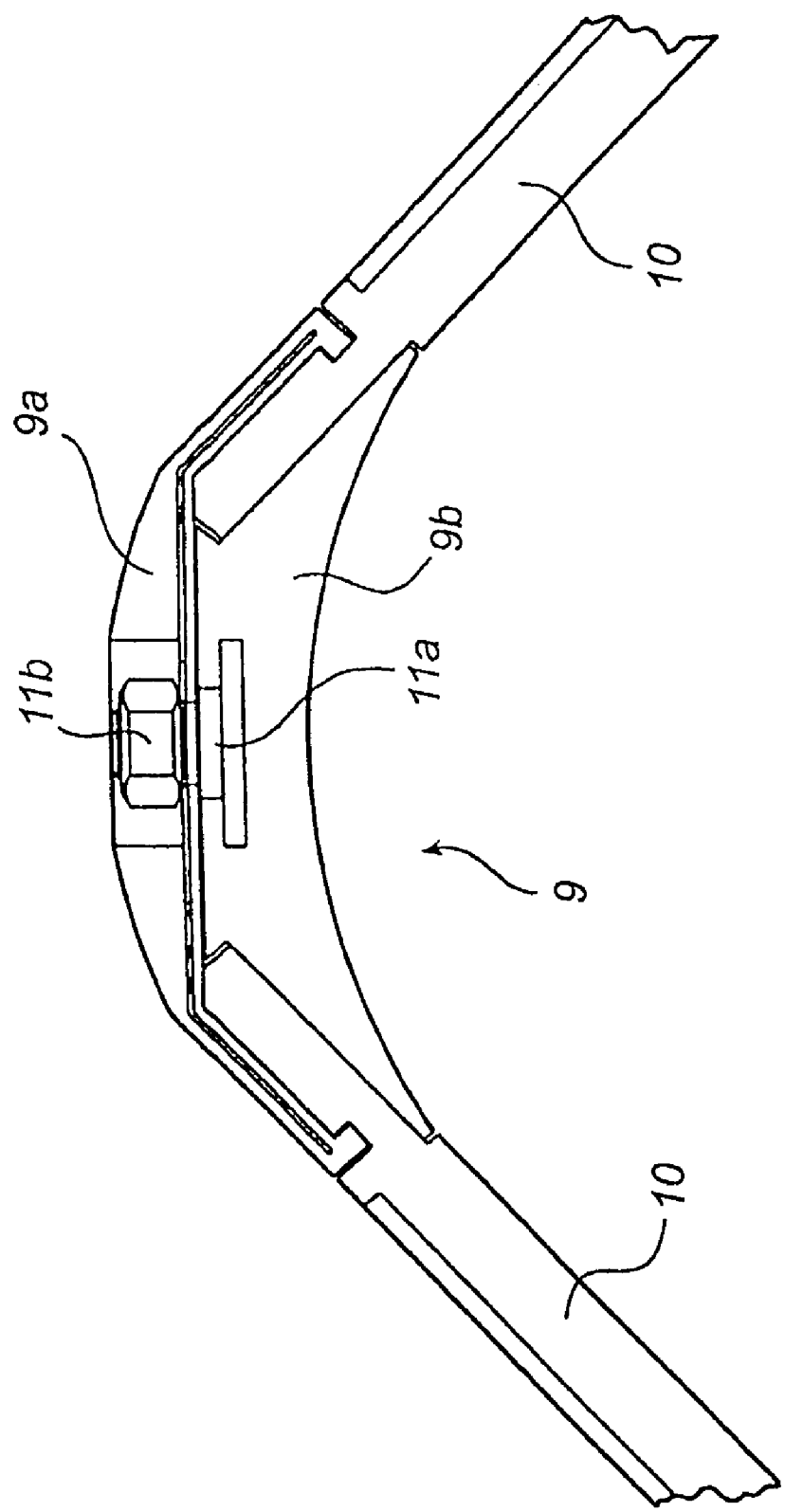
FIG. 3 is a top plan view in detail of a corner element of the chute element in FIG. 2, FIGS. 4a and 4b illustrate exchange of a wall element of the chute element in FIG. 2.

Owing to the guides 5, 7, it is possible to release a chute element 2 from the chute 1 by merely loosening the outermost screw 5b in each guide. For the inventive chute 2 to achieve the desired purposes, the interconnection of neighbouring wall elements 10 is a key point. The entire structure must be stable while at the same time an individual wall element 10 must be easy to replace. When designing the corner elements 9 suitable for this purpose, there are several matters to be taken into consideration. For telescopic chutes, it is important to minimise the risk of material baking on. This risk increases with sharp corners, gap, edges and the like. It is therefore preferred for the corner element 9 to form a rounded inner corner 9b between the wall elements 10. FIG. 3 illustrates this in the form of a circular arc. For the same reason, it is preferred for the corner element 9 and neighbouring wall elements 10 to be mounted flush with each other to minimise the areas in which baking-on can occur. It is also desirable for the corner elements 9 to have inner and outer parts 9a and 9b, respectively, which are connected by connecting means in the form of a screw and nut joint 11, in which a screw 11a is cast into the inner corner element part 9b and passes through a hole 12 in the outer corner element part 9a, after which it engages a nut 11b mounted from the outside, so that these parts 9a and 9b hold the replaceable wall elements 10 between them. The corner elements 9a, 9b thus fix, in use, the wall elements 10 in the normal direction of their largest side faces.

Figure 4C:
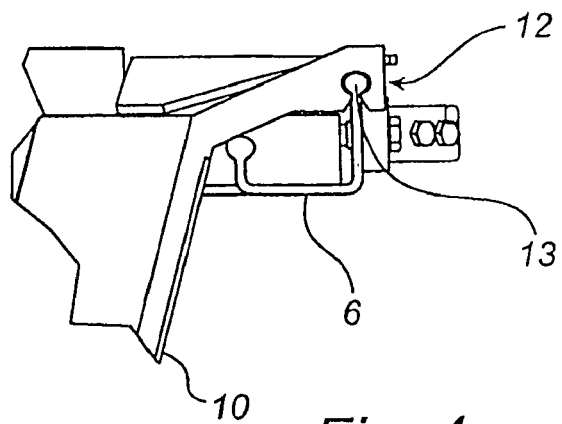
FIG. 4c shows a detail of the attachment of a wall element to the frame of the chute element in FIG. 2.

Each wall element 10 comprises in its upper portion an undercut groove 12. FIG. 4c shows how the wall elements 10 can thus be snapped in place over a profile 13 formed in the frame 6. Due to such snap locking, the replaceable wall elements 10 are safely held but at the same time easy to remove from the frame 6.

The wall element 10 of the shown chute 1 is made of polyurethane with a hardness of 70-90° Shore A. Other elastomeric materials can also be used, such as rubber with a hardness of 40-65° Shore A.

In some cases it may be convenient for the wall elements 10 to be made of metal. For example, this is convenient when conveying different types of food, such as cereals.

If the replaceable wall element 10 is made of metal or some other non-elastic material, a strip (not shown) is suitably arranged on the replaceable wall element or the frame, whereby snap locking can still be obtained.

The inner corners 9 lock the wall elements 10 in the lateral direction. Covers 14, which are detachably mounted in the frame 6 by means of, for instance, screw joints, prevent the inner corners 9 from being pressed up from their engagement with the frame 6, for instance when the chute elements are stacked. In this way, the wall elements 10 are locked in three dimensions. Attachment/release of all detachably mounted components is performed from the outside of the chute element 2.

The inventive chute also opens for options of custom-made constructions since individual wall elements can be made of materials different from those of the remaining construction. An individual wall element subjected to extreme local wear can be replaced, for instance, by a wall element of metal, ceramic material or the like, if this is preferred. It is also possible to specially design sides with inlays of a different material. If the field of application makes it necessary, for instance for hygienic reasons when transporting foods, the wall elements could be made of polyurethane coated with a layer of metal. When worn-out, the layer of metal can then be replaced.

To reduce the tendency of the wall elements to arch, or if the strength of the elastomeric material for some other reason has to be increased, this is preferably done by means of reinforcement of polycarbonate plastic (PC), which simplifies manufacture and destruction of the wall elements, compared with conventional metal reinforcement.

Figure 4A:
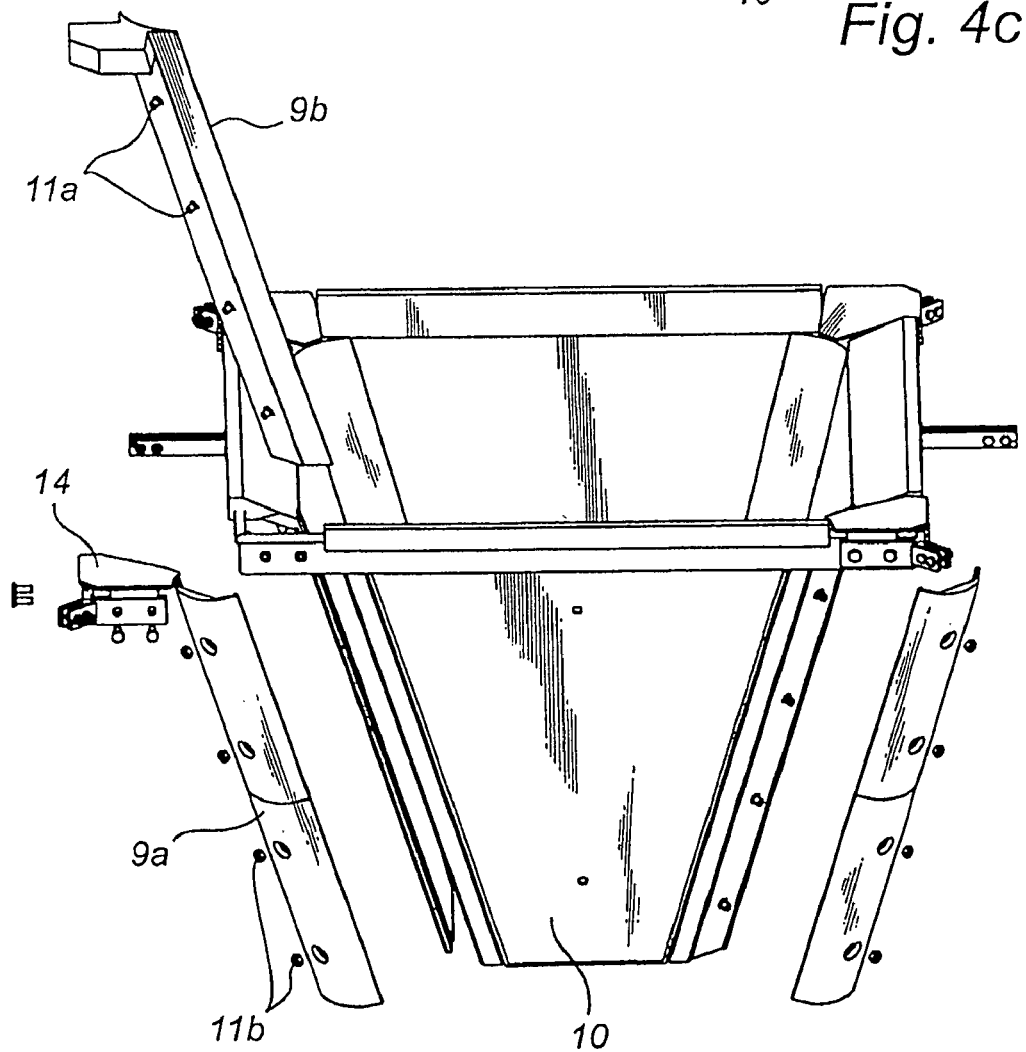
Figure 4B:
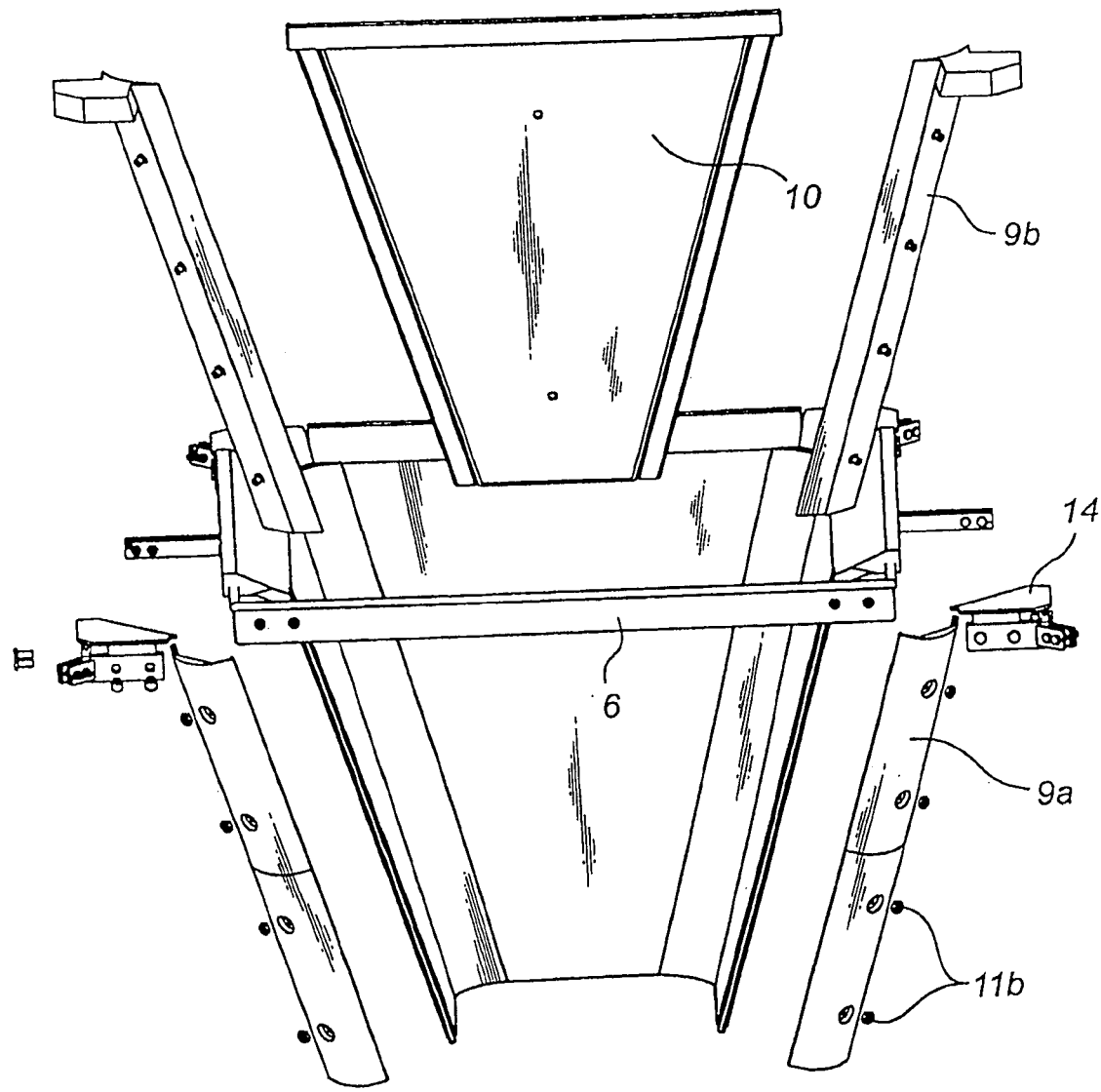

FIGS. 4a and 4b show how, in the preferred embodiment, a wall element 10 is replaced after releasing the chute element 2 from the chute 1.

1—The corner elements 9a, 9b round the wall element 10 which is to be replaced are dismounted by releasing the screw and nut joint 11 from the outside.

2—The cover 14 over each corner element 9 is released and the inner portions 9b of the corner elements 9 can be removed.

3—An upward force is applied to the lower part of the wall element 10, whereby the wall element 10 swings up and thus is released from the frame profile 13. If necessary, for instance a crowbar is used to release the undercut groove 12 from the frame profile 13. After that the released wall element can be removed.

4—A new wall element 10 is placed with its undercut groove 12 over the frame profile 13, after which it is pressed or knocked into place. The rest of the mounting then occurs according to steps 1, 2 and 3 in reverse order.

It would also be possible to replace a wall element 10 while the chute element 2 is mounted in the chute 1, but it is easier to remove the chute element 2 and perform the replacement of the wall element on the ground.

It will be appreciated that many modifications of the above-described embodiments of the invention are conceivable within the scope of the invention, which is defined in the appended claims. For instance, the wall elements 10 can be made of polycarbonate plastic reinforced polyurethane, elastomeric materials other than polyurethane, metal or a combination thereof. To prevent dust explosions, the used material should be antistatic.

The connection between the frame 6 and the wall element 10 can be of a type different from that described above, which gives an effect corresponding to that of the undercut groove 12, for instance a screw joint.

The rounded corner 9b can, instead of a circular arc, be described as a facet with obtuse angles, an ellipse or an otherwise rounded shape, which reduces baking-on of material.

Moreover the hoist guides 5 can be excluded on intermediate chute elements 2, so that only one wire guide in the upper part of the chute and one wire fixing point in the lowermost chute element 2 of the chute are used. In this way, force loads on the chute elements will be reduced.

In the example shown, the chute elements 2 are square, seen from above. However, it goes without saying that the chute elements can also be rectangular. It is also conceivable to design the chute elements with two parallel long sides connected by two modified corner elements in the form of circular arcs, that is the chute element can have the form of a running track.

The wall elements need not necessarily be perfectly smooth on their inside. Depending on the material that is to be handled in the chute, it may be desirable to make the insides of the wall elements grooved. It must then be taken into consideration that the risk of baking-on increases.

The invention claimed is:

1. A chute for mechanical guiding of pieces or particles of material, said chute comprising two or more separate chute elements mounted coaxially above each other and connected by flexible connecting devices and designed to be telescopically mutually stackable, characterised in that the separate chute elements have two or more replaceable walls connected by corner elements.

2. A chute as claimed in claim 1, wherein the chute elements are detachably mounted.

3. A chute as claimed in claim 1, wherein the walls are straight.

4. A chute as claimed in claim 1, wherein the corner elements form a rounded inner corner between the walls.

5. A chute as claimed in claim 4, wherein the inner corner has the form of a facet with obtuse angles.

6. A chute as claimed in claim 4, wherein the inner corner has the form of a circular arc.

7. A chute as claimed in claim 1, wherein the corner elements are mounted flush with the walls so that the chute elements have a smooth inside.

8. A chute as claimed in claim 1, wherein the corner elements comprise outer and inner parts which between them hold the neighbouring walls.

9. A chute as claimed in claim 1, wherein the walls in their upper portion have an undercut groove by means of which they are detachably mounted on a frame arranged along the circumference of the chute element.

10. A chute as claimed in claim 1, wherein the walls are bevelled inwards at their upper edge.

11. A chute as claimed in claim 1, wherein at least one of the walls is made of metal.

12. A chute as claimed in claim 1, wherein at least one of the walls has a material combination of metal and elastomer.

13. A chute as claimed in claim 1, wherein at least one of the walls has a material combination of elastomer and ceramic.

14. A chute as claimed in claim 1, wherein at least one of the walls is made of an elastomeric material.

15. A chute as claimed in claim 14, wherein the elastomeric material is polyurethane.

16. A chute as claimed in claim 15, wherein the polyurethane has a hardness of 70-90° Shore A.

17. A chute as claimed in claim 14, wherein the elastomeric material is rubber.

18. A chute as claimed in claim 17, wherein the rubber has a hardness of 40-65° Shore A.

19. A chute as claimed in claim 14, wherein the elastomeric material has a reinforcement of polycarbonate plastic.

* * * * *